United States Patent [19]

Nakazawa

[11] Patent Number: 5,134,043
[45] Date of Patent: Jul. 28, 1992

[54] OPERATION METHOD FOR POWER GENERATION SYSTEM USING FUEL CELL

[75] Inventor: Kenzo Nakazawa, Yokohama, Japan

[73] Assignee: Ishikawajima-Harima Heavy Industries Co., Ltd., Tokyo, Japan

[21] Appl. No.: 654,837

[22] Filed: Feb. 13, 1991

[30] Foreign Application Priority Data

Feb. 15, 1990 [JP] Japan .................................. 2-34532

[51] Int. Cl.$^5$ .............................................. H01M 8/06
[52] U.S. Cl. ........................................ 429/16; 429/17; 429/34
[58] Field of Search ............................ 429/16, 17, 34

[56] References Cited

U.S. PATENT DOCUMENTS

| | | | |
|---|---|---|---|
| 2,901,524 | 8/1959 | Gorin et al. | 429/17 |
| 4,333,992 | 6/1982 | Healy | 429/17 |
| 4,755,376 | 7/1988 | Marianowski | 429/17 X |
| 4,921,765 | 5/1990 | Gmeindl et al. | 429/16 |

FOREIGN PATENT DOCUMENTS

56-69775  6/1981  Japan .................................. 429/17

*Primary Examiner*—Stephen Kalafut
*Attorney, Agent, or Firm*—Trexler, Bushnell, Giangiorgi & Blackstone, Ltd.

[57] ABSTRACT

Anode gas is fed to an anode chamber of a molten carbonate fuel cell and cathode gas is fed to a cathode chamber of the fuel cell. $CO_2$ is separated from gases discharged from the cathode chamber of the fuel cell by a $CO_2$ separator or by another fuel cell which serves as the $CO_2$ separator. The separated $CO_2$ is entirely or partially is introduced to the cathode chamber with gases discharged from the anode chamber such that a $CO_2$ concentrations in the cathode chamber is raised and the power generation is performed at a low $CO_2$ utilization factor mode.

22 Claims, 7 Drawing Sheets

OPERATION METHOD FOR POWER GENERATION SYSTEM USING FUEL CELL

BACKGROUND OF THE INVENTION

1. Technical Field

The present invention relates to a method of operating a power generation system using a fuel cell including molten carbonate, and particularly relates to an operation method for such a system to achieve a high efficiency power generation.

2. Background Art

A known molten carbonate-type fuel cell generally includes a plurality of fuel cell elements. Each fuel cell element includes an electrolyte plate (tile), a cathode (oxide electrode) and an anode (fuel electrode). The electrolyte plate includes a porous substance soaked with molten carbonate, and the cathode electrode and the anode electrode sandwich the electrolyte plate. A cathode chamber is formed in the cathode electrode and an anode chamber is formed in the anode electrode. Oxidizing gas is fed to the cathode chamber whereas fuel gas is fed to the anode chamber to cause power generation due to an electric potential difference between the cathode electrode and the anode electrode. A plurality of fuel cell elements are stacked one after another with separators being interposed between each two fuel cell elements.

Figure 14:
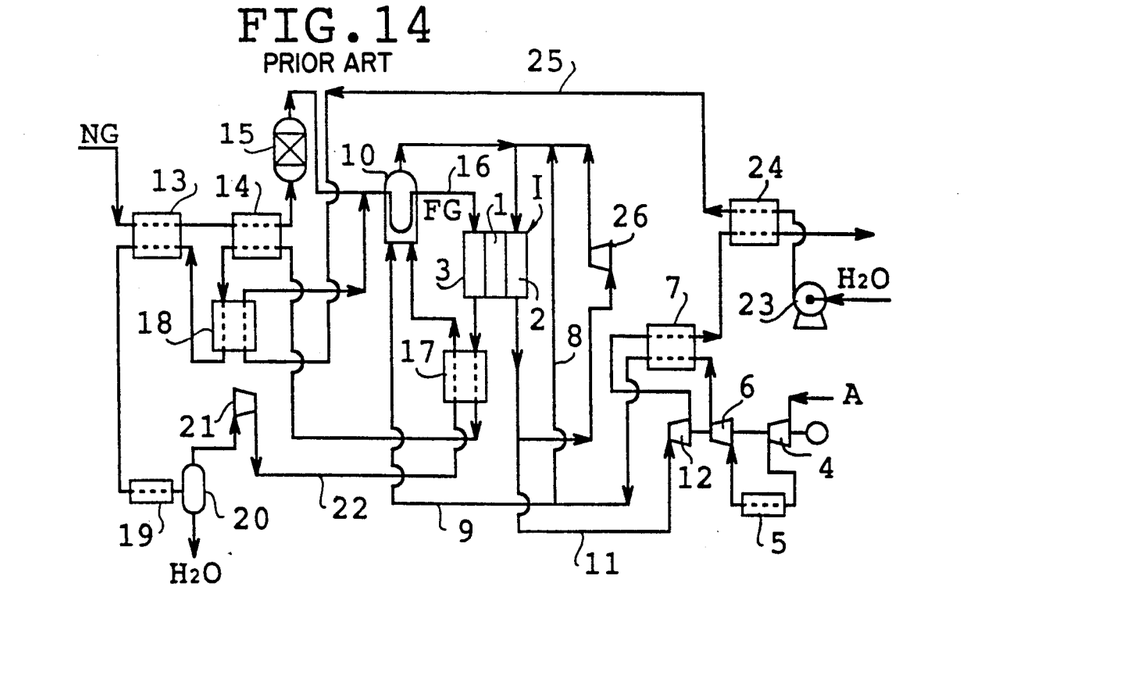
FIG. 14 illustrates a schematic view of a conventional natural gas reforming molten carbonate fuel cell system.

Among power generation systems using the fuel cell of the above-mentioned type, a typical natural gas reforming type power generation system is illustrated in FIG. 14. An electrolyte plate 1 is sandwiched by a cathode and an anode. A cathode chamber 2 is provided over the cathode and an anode chamber 3 is provided over the anode to form a fuel cell I. Part of air A is pressurized by a compressor 4, cooled by a cooling device 5, pressurized again by another compressor 6 and preheated by an air preheater 7 before introduced to the cathode chamber 2 through an air feed line 8. Remaining part of the air A is introduced to a combustion chamber of a reformer 10 by a branch line 9. Gases discharged from the cathode chamber are introduced to a turbine 12 through a cathode exhaust gas line 11 and then expelled to atmosphere via the air preheater 7.

On the other hand, natural gas ($CH_4$) NG flows through a natural gas preheater 13 and 14, a desulfurizer 15 and the reformer 10. The natural gas NG is reformed to fuel gas FG in the reformer 10 and the fuel gas GF is fed to the anode chamber 3 of the fuel cell I. Gases discharged from the anode chamber 3 are led to a heat exchanger 17, the natural gas preheater 14, a heating device 18, the natural gas preheater 13 and a condensor 19. The gases are cooled in the condensor 19 and introduced to a gas-liquid separator 20. In the gas-liquid separator 20, $H_2O$ is separated from the gases (anode exhaust gas), and then the gases are pressurized by a blower 21, introduced to the combustion chamber of the reformer 10 through a line 22 extending to the heat exchanger 17 and fed into the anode chamber 2 from the reformer 10. The separated $H_2O$ is compressed by a pump 23 and led to a water heater 24 to become steam. The steam flows through the steam generator 18 and merges with the natural gas NG at an entrance of the reformer 10. Numeral 26 designates a blower used for a cathode recirculation.

When the molten carbonate fuel cell is operated for power generation, the natural gas ($CH_4$) is reformed and fed to the anode chamber 3. In this case, a following reaction takes place in the reformer 10:

$$CH_4 + H_2O \rightarrow CO + 3H_2$$

In the cathode chamber 2 of the fuel cell I, on the other hand, a following reaction takes place:

$$CO_2 + \tfrac{1}{2}O_2 + 2e^- \rightarrow CO_3^{--}$$

In the latter reaction, a carbonate ion $CO_3^{--}$ is produced and this carbonate ion $CO_3^{--}$ reaches the anode via the electrolyete plate 1. In the anode, the fuel gas reformed by the reformer 10 is introduced and contact the carbonate ion $CO_3^{--}$, thereby causing following reactions:

$$CO_3^{--} + H_2 \rightarrow CO_2^{--} + H_2O + 2e^-$$

$$CO_3^{--} + CO \rightarrow 2CO_2 + 2e^-$$

Therefore, $5CO_2$ and $3H_2O$ are discharged as the anode exhaust gas. In this manner, upon the power generation in the molten carbonate fuel cell, $CO_2$ is absorbed in the cathode whereas the same amount of $CO_2$ is produced in the anode. This can be said, at least apparently, that $CO_2$ is separated from the cathode gas and the separated $CO_2$ is transferred to the anode.

In the reaction at the cathode 2, if the $CO_2$ concentration at the cathode is high, the reaction is accelerated and the fuel cell voltage becomes higher so that the power generation efficiency will be raised.

However, in the conventional molten carbonate type fuel cell system, $CO_2$ among the anode exhaust gas discharged from the anode chamber 3 is introduced to the cathode chamber 2 to feed necessary $CO_2$ to the cathode chamber 2 and $CO_2$ recirculatedly fed to the cathode chamber 2 is diluted by the air. Therefore, the $CO_2$ concentration at the entrance of the cathode chamber 2 is very low, for example 7% which is considerably lower than a standard concentration of 30%. Consequently, the cell voltage is lower.

SUMMARY OF THE INVENTION

A primary object of the present invention is to provide an operation method for a power generation system using a molten carbonate fuel cell for improving a power generation efficiency by raising a concentration of $CO_2$ fed to a cathode chamber of the fuel cell to lower a utilization factor of $CO_2$ and to maintain a $CO_2$ partial pressure at a proper level.

Another object of the present invention is to provide a power generation system using a fuel cell operation method for lowering the $CO_2$ concentration of a cathode exhaust gas discharged to atmosphere.

According to one aspect of the present invention, there is provided a power generation system operation method using a molten carbonate fuel cell including an electrolyte plate sandwiched by a cathode and an anode with oxidizing gas being fed to a cathode chamber and fuel gas being fed to an anode chamber, characterized in that $CO_2$ among gases discharged from the cathode chamber (referred to as "cathode exhaust gas") is separated by a $CO_2$ separator and the separated $CO_2$ is entirely or partially fed to the cathode chamber with $CO_2$ contained in gases discharged from the anode chamber (referred to as "anode exhaust gas") such that the $CO_2$ concentration of the gases introduced to the cathode chamber is raised and the $CO_2$ utilization factor is lowered.

In stead of the $CO_2$ separator, another molten carbonate fuel cell may be provided. In such a case, gases containing a large amount of $CO_2$ are forced to go to a cathode chamber of a downstream fuel cell from a cathode chamber of an upstream fuel cell. $CO_2$ among an anode exhaust gas discharged from the anode chamber of the downstream fuel cell is entirely or partially fed to the cathode chamber of the upstream fuel cell with $CO_2$ among an anode exhaust gas discharged from the upstream fuel cell.

In addition, part of the cathode exhaust gas discharged from the cathode chamber(s) of one or both of the upstream and the downstream fuel cells is recirculated to its or their own cathode chamber entrance(s) to lower the $CO_2$ utilization factor at the cathode.

As $CO_2$ separated by the $CO_2$ separator is recirculated to the cathode chamber entrance, the $CO_2$ concentration at the cathode chamber entrance becomes higher. When an amount of $CO_2$ used in the molten carbonate fuel cell is constant, the utilization factor drops as the $CO_2$ concentration rises. Therefore, a $CO_2$ retaining amount becomes larger and the $CO_2$ partial pressure from the cathode entrance through the cathode exit becomes higher. As a result, the reaction is promoted and the power generation efficiency is improved.

In a case where a molten carbonate fuel cell is used instead of the $CO_2$ separator, cathode chambers of two fuel cells are connected to each other in series, an upstream fuel cell is operated in a low $CO_2$ utilization factor mode and excessive $CO_2$ is fed to a cathode chamber entrance of a downstream fuel cell from a cathode chamber exit of the upstream fue cell, $CO_2$ is used for the reaction at the cathode and the $CO_2$ separation is carried out during the power generation. As $CO_2$ among the anode exhaust gas discharged from the anode chamber of the downstream fuel cell is recircualted to the cathode chamber of the upstream fuel cell, the $CO_2$ concentration in the cathode chamber is raised so that the $CO_2$ utilization factor is lowered. At the same time, the $CO_2$ partial pressure can be maintained at a proper level so that the reaction in the cathode is promoted and the power generation efficiency is raised. In the foregoing method, if $CO_2$ is recirculated from the cathode chamber exit to the cathode chamber entrance of one or both of the upstream and the downstream fuel cells, the $CO_2$ utilization factor at the cathode drops and desired operation conditions for an entire system can be selected.

Other objects and advantages of the present invention will be apparent from the following detailed description and the claims taken in connection with the accompanying drawings.

DESCRIPTION OF THE PREFERRED EMBODIMENTS

Now, preferred embodiments of the present invention will be explained with reference to the accompanying drawings. In the following description, however, a reformer, a catalyst combustor and so on which are incorporated in a molten carbonate fuel cell power generation system are omitted for an illustrative purpose.

Generally, gases discharged from an anode chamber of a molten carbonate fuel cell contain a large amount of $CO_2$, $H_2$ as large amount of as $CO_2$, a relatively small amount of $H_2$ and CO. In order to feed $CO_2$ contained in the gases discharged from the anode chamber, $H_2$ and CO are combusted by a catalyst combustor or combusible components are removed by a gas separation before fed to a cathode chamber of the fuel cell. There are some devices for this purpose. For example, the reformer 10 of FIG. 12 functions as such a device. However, the present invention does not intend to disclose this type of device. Thus, the explanation of these devices are omitted in the following description. In addition, a heat exchanger, a moisture removal device and so on for optimizing the system operation will not be explained.

Figure 1:
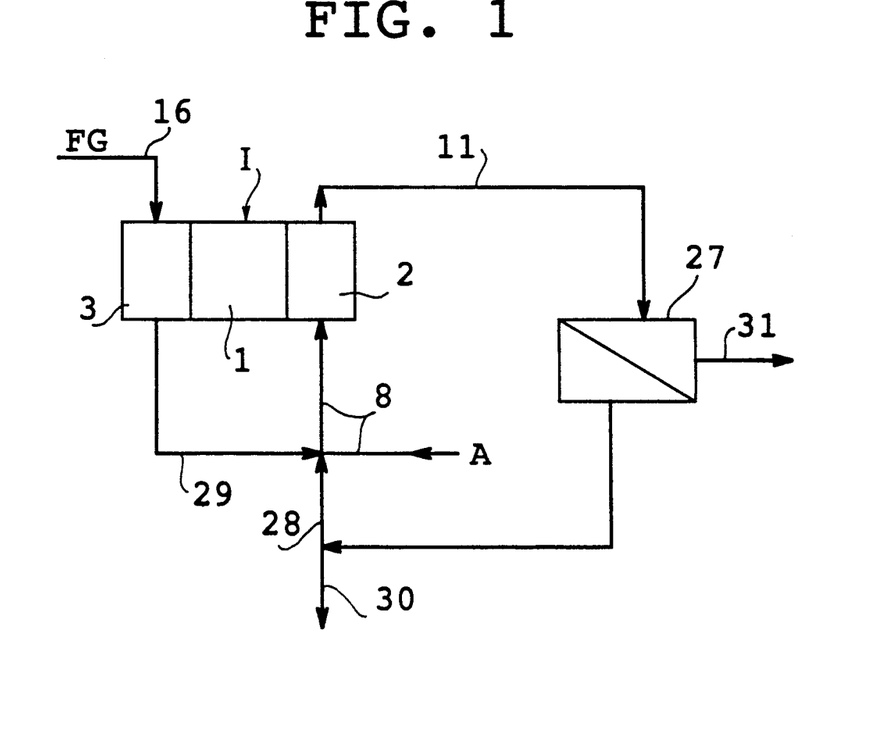
FIG. 1 shows a schematic view of a power generation system for a first embodiment of the present invention.

FIG. 1 shows a first embodiment of a method according to the present invention. An electrolyte plate 1 soaked with carbonate is sandwiched by a cathode and an anode at respective faces of the electrolyte plate 1, thereby forming a fuel cell I. Oxidizing gas is fed to a cathode chamber and fuel gas is fed to an anode chamber. In this embodiment, air A (oxidizing gas) is fed to an entrance of the cathode chamber 2 by an air feed line 8 and fuel gas FG (anode gas) is fed to an entrance of the anode chamber 3 by a fuel gas feed line 16. A cathode exhaust gas line 11 is connected to an exit of the cathode chamber 2 and a $CO_2$ separator 27 is provided on the cathode exhaust gas line 11. The $CO_2$ separator 27 may be a separation film type. $CO_2$ separated by the $CO_2$ separator 27 is recirculated to the entrance of the cathode chamber 2 through a $CO_2$ recirculation line 28 extending from the $CO_2$ separator 27 to the air feed line 8. Combusible components is removed from the anode exhaust gas containing $CO_2$ (not illustrated) and then the anode exhaust gas is fed to the cathode chamber 2 through an anode exhaust gas line 29. A $CO_2$ branch line 30 is connected to the $CO_2$ circulation line 28 so that part of $CO_2$ can be branched for another purpose. The air whose $CO_2$ has been separated by the $CO_2$ separator 27 is expelled to atmosphere through a line 31.

For the operation of the fuel cell I, an amount of $CO_2$ required for the reactions at the cathode is calculated beforehand and an excessive amount (more than the calculated amount) of $CO_2$ is fed to the cathode chamber 2 so that the $CO_2$ concentration at the cathode chamber entrance becomes high. Surplus $CO_2$ is discharged from the cathode chamber 2 and introduced to the $CO_2$ separator 27. Only $CO_2$ is separated by the separator 27 and the separated $CO_2$ is entirely or partially recirculated to the cathode 2 by the $CO_2$ circulation line 28.

$CO_2$ among the gases discharged from the anode chamber 3 is fed to the entrance of the cathode chamber 2 in addition to the recirculated $CO_2$. This means that the amount of $CO_2$ fed is larger than an amount required for the cathode reaction and the $CO_2$ concentration at the cathode chamber 2 is high. However, even if an excessive amount of $CO_2$ is fed to the cathode chamber 2, an amount of $CO_2$ used in the cathode reaction does not exceed an amount required for the reaction. Therefore, the $CO_2$ utilization factor at the cathode chamber 2 drops as the $CO_2$ concentration at the cathode chamber entrance rises.

Figure 2:
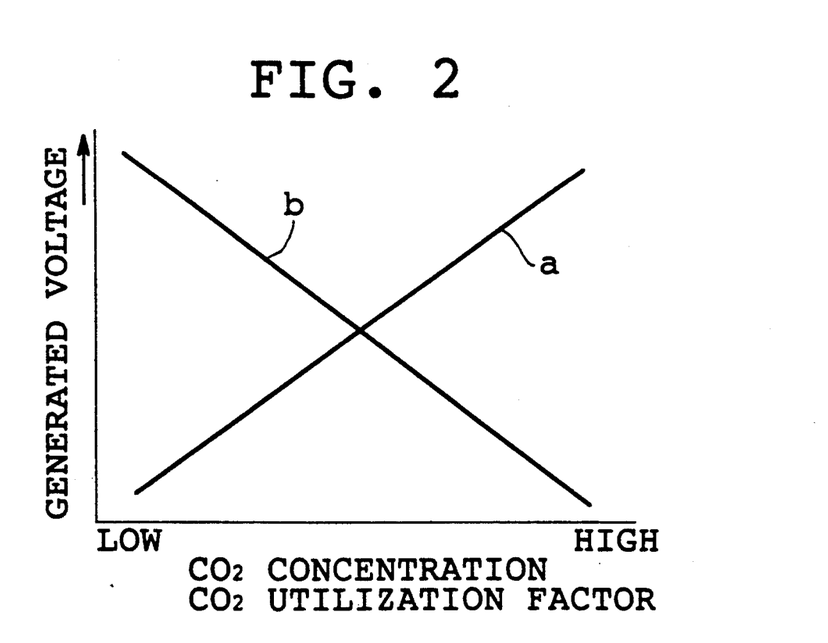
FIG. 2 shows a relation between a $CO_2$ concentration at a cathode chamber entrance, a $CO_2$ utilization factor and a generated voltage.

In the present invention, the fuel cell I is operated in a low $CO_2$ utilization mode with the $CO_2$ concentration at the cathode chamber entrance being raised, so that a high voltage is generated and the power generation efficiency is improved. As the $CO_2$ utilization factor is lowered, the retaining amount of $CO_2$ which promotes the reaction at the cathode is increased, so that the $CO_2$ partial pressure from the cathode chamber entrance through the cathode chamber exit is maintained at a high level. Consequently, a high voltage is generated and the power generation efficiency is raised. The relation between the $CO_2$ concentration, the $CO_2$ utilization factor and the generated voltage is shown in FIG. 2. As seen from FIG. 2, the generated voltages rises as the $CO_2$ concentration a at the cathode chamber entrance becomes higher. On the other hand, the generated voltage drops as the $CO_2$ utilization factor b becomes higher and the voltage rises as the utilization factor b drops. Here, the $CO_2$ concentration represents a ratio of $CO_2$ to entire gases. The $CO_2$ concentration varies with design factors. Therefore, generally it is difficult to show the $CO_2$ concentration quantitatively and an absolute amount of $CO_2$ is used instead of $CO_2$ concentration in the following description.

Figure 3:
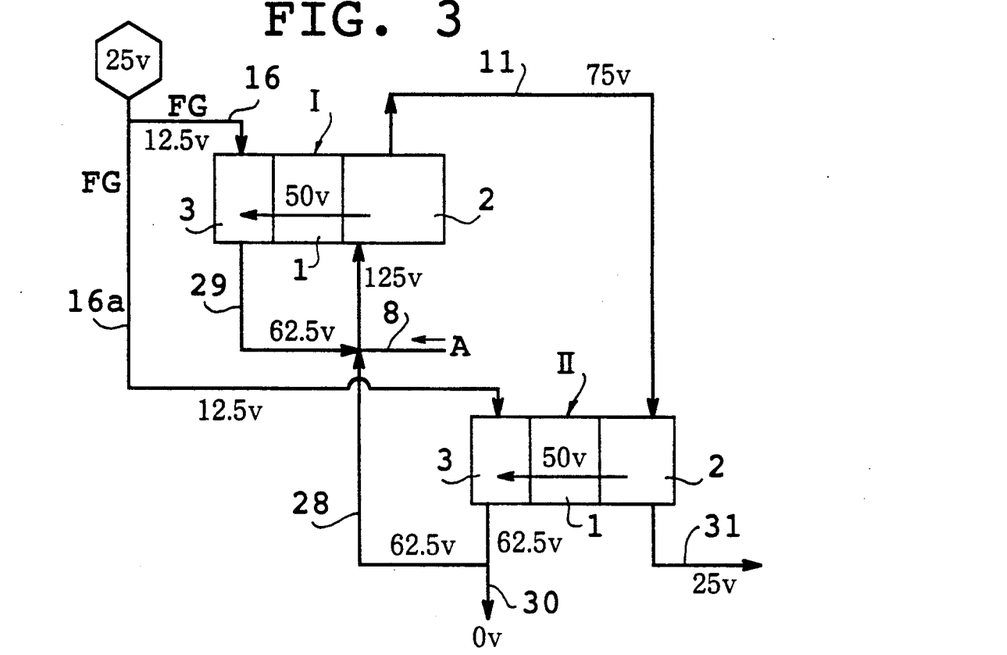
FIG. 3 shows a schematic diagram of a power generation system to carry out a method of second embodiment of the present invention.

FIG. 3 illustrates another embodiment of the present invention. A second molten carbonate fuel cell II is provided instead of the $CO_2$ separator 27. The second fuel cell II performs the same functions as the separator 27. A cathode exit of the upstream or first fuel cell I is directly connected with an entrance of the downstream fuel cell II. The upstream fuel cell I is operated in a low $CO_2$ utilization mode and a necessary amount of $CO_2$ is fed to the downstream fuel cell II. In this case, a capacity ratio between the fuel cells I and II can be arbitrarily determined as required, but in this particular embodiment the fuel cells I and II have the same capacity. Specifically, the fuel cell II is located downstream of the fuel cell I such that the fuel cell II serves as the $CO_2$ separator, air is introduced to the cathode chamber entrance of the fuel cell I by an air feed line 8, anode exhaust gas discharged from the anode chamber 3 is introduced to the cathode chamber of the fuel cell I by an anode exhaust gas line 29 and a cathode exhaust gas line 11 of the cathode chamber 2 is connected to a cathode chamber entrance of the downstream fuel cell II so as to connect the cathode chambers of the fuel cells I and II with each other directly. Therefore, an excessive amount of $CO_2$ discharged from the cathode chamber 2 of the upstream fuel cell I is fed to the cathode chamber 2 of the downstream fuel cell II, and $CO_2$ which is used in the cathode reaction at the down stream fuel cell II and then separated is recovered from the anode chamber 3. The recovered $CO_2$ is entirely or partially introducted to the cathode chamber entrance of the upstream fuel cell I by a $CO_2$ recirculation line 28. Fuel gas feed lines 16 and 16a are respectively connected with the anode chambers 3 of the fuel cells I and II and the same amount of fuel gas is introduced to the anode chambers of the two fuel cells.

In the upstream fuel cell I, a large amount of $CO_2$ (amount larger than used in the cathode reaction) is transferred to the cathode chamber 2 so that the $CO_2$ concentration at the cathode chamber entrance be high. In addition, a surplus $CO_2$ is discharged from the cathode chamber 2 of the upstream fuel cell I and led to the cathode chamber 2 of the downstream fuel cell II. Accordingly, the downstream fuel cell II is operated in the low $CO_2$ utilization mode. In the downstream fuel cell II, the power generation takes place using $CO_2$ discharged from the upstream cathode chamber 2 and the $CO_2$ separation is performed. Gases discharged from the anode chamber 3 of the downstream fuel cell II are returned to the cathode chamber 2 of the upstream fuel cell I, i.e., the separated and recovered $CO_2$ at the downstream side is recirculated to the upstream side.

Now, an example using specific numbers will be explained. In a case where LNG is used as raw material, an amount of $CO_2$ fed to the anode chamber 3 contained in the fuel gas is 25% of $H_2$. Thus, when a total amount of $H_2$ used in the reaction is 100 V, $CO_2$ of 25 V is divided to two and the same amount of $CO_2$ is respectively fed to the anode chambers 3 of the fuel cells I and II. $CO_2$ of 62.5 V (sum of 12.5 V fed to the anode chamber 3 and 50 V used in the cell reaction) and $CO_2$ of 62.5 V discharged and recirculated from the anode chamber 3 of the downstream fuel cell II, like the upstream fuel cell I, are led to the cathode chamber entrance of the upstream fuel cell I. In a word, $CO_2$ of 125 V is fed to the cathode chamber entrance of the upstream fuel cell I. Among $CO_2$ gases thus fed, used is the 50 V, and the remainder ($CO_2$ of 75 V) is fed to the cathode chamber 2 of the downstream fuel cell II. In the fuel cell II, $CO_2$ of 50 V is used and the remainder ($CO_2$ of 25 V) is expelled to atmosphere. Therefore, in the upstream fuel cell I, the $CO_2$ concentration at the cathode chamber entrance is high and the $CO_2$ utilization factor is as low as 40%. Accordingly, the upstream fuel cell I serves as a $CO_2$ accumulator which can retain a large amount of $CO_2$. In addition, the $CO_2$ partial pressure from the cathode chamber entrance through the cathode chamber exit is maintained at a high level. Thus, the voltage to be generated can be set to a high value. On the other hand, in the downstream fuel cell II which serves as the $CO_2$ separator, the $CO_2$ utilization factor is as high as 66.7% and the $CO_2$ recovering efficiency is raised.

In the system of FIG. 3, the cathode exhaust gas discharged from the cathode chamber 2 of the upstream fuel cell I may be expelled to atmosphere without being introduced to the cathode chamber 2 of the downstream fuel cell II. In addition, $CO_2$ discharged from the anode chamber 3 of the downstream fuel cell II may be fed to the cathode chamber 2 of itself II without being recirculated to the upstream side. In short, the fuel cells I and II may be independent from each other. In such a case, the amounts of $CO_2$ at the cathode chamber entrances of the two fuel cells I and II are respectively 62.5 V and the amounts of $CO_2$ used are respectively 50 V. Therefore, the $CO_2$ utilization factors of the fuel cells I and II are respectively 80%. This means that the $CO_2$ utilization factors are high respectively, amounts of retaining $CO_2$ are low respectively and the $CO_2$ partial pressures drop at the exits of the cathode chambers respectively. Thus, a high voltage cannot be expected. According to the present invention, on the other hand, the fuel cells I and II are connected with each other and the $CO_2$ concentration at the cathode chamber entrance of the upstream fuel cell I is high so as to discharge the surplus $CO_2$, i.e., the upstream fuel cell I is operated in the low $CO_2$ utilization factor mode. Therefore, the fuel cells I and II are operated at the high $CO_2$ concentration and at the low $CO_2$ utilization factor mode respectively as compared with the case of the two fuel cells being operated separately. In addition, the $CO_2$ partial pressure can be maintained at a higher level. Consequently, the generated voltage becomes higher.

Figure 4:
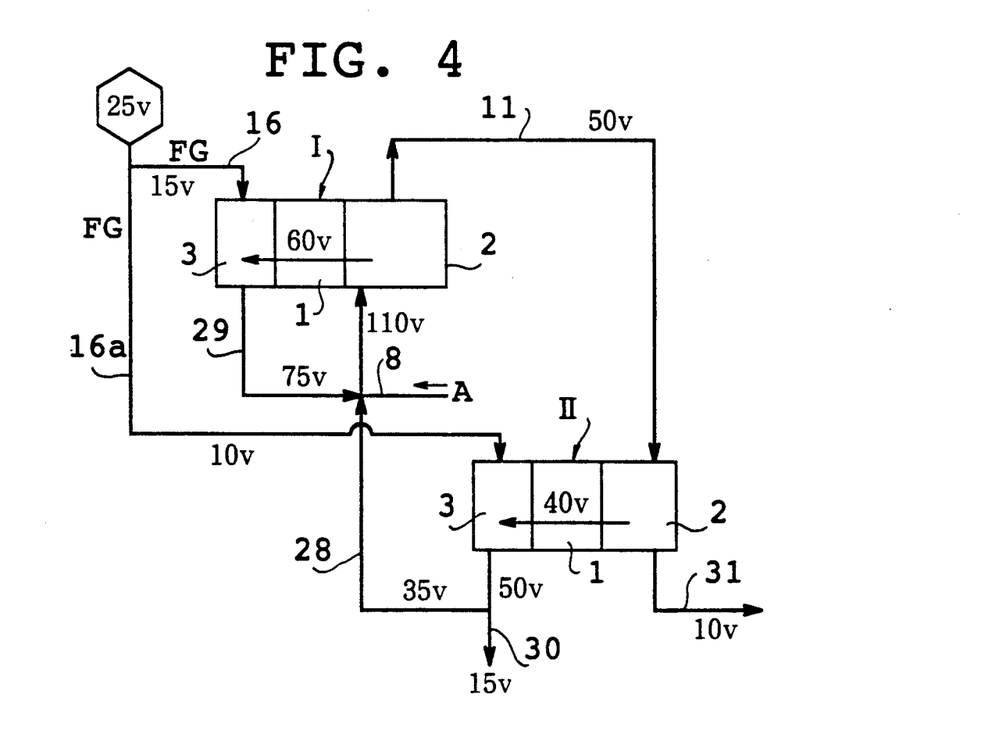
FIG. 4 shows a system diagram modified from FIG. 3.

FIG. 4 shows a modified version of FIG. 3. In a system similar to the system of FIG. 3, the capacity of the upstream fuel cell I is set to be different from the capacity of the downstream fuel cell II. Specifically, the fuel cell I having a larger capacity is located upstream and the fuel cell II having a smaller capacity is located downstream. The downstream fuel cell II serves as the $CO_2$ separator.

Due to the capacity difference between the two fuel cells, amounts of $CO_2$ fed to the anode chambers 3 are set to 15 V and 10 V respectively, as illustrated in FIG. 4. An amount of $CO_2$ used in the fuel cell I is set to 60 V and that used in the fuel cell II is set to 40 V such that $CO_2$ of 50 V in total is discharged from the anode chamber 3. Among $CO_2$ of 50 V, $CO_2$ of 35 V is recirculated to the cathode chamber 2 of the upstream fuel cell I. $CO_2$ of 50 V is discharged from the cathode chamber 2 of the upstream fuel cell I and introduced to the cathode chamber 2o of the downstream fuel cell II.

In this embodiment, an amount of $CO_2$ led to the cathode chamber 2 of the upstream fuel cell I is a sum of 75 V transferred from the anode chamber 3 and 35 V recirculated, i.e., 110 V. On the other hand, an amount of $CO_2$ used is 60 V, and therefore the remaining 50 V $CO_2$ is discharged. Consequently, the $CO_2$ concentration at the cathode chamber entrance is high and the $CO_2$ utilization factor is low (54.5%). This means that the fuel cell I is operated in the low $CO_2$ utilization mode, an amount of the retaining $CO_2$ in the cathode chamber 2 is large and the generated voltage is high. In the downstream fuel cell II, the power generation and the $CO_2$ separation are performed, but the $CO_2$ recovery is a primary object, so that the $CO_2$ utilization factor is high (80%) and accordingly the generated voltage is not high as the system of FIG. 3. However, an amount of $CO_2$ expelled to atmosphere is very small (10 V) and therefore this contributes to a prevention of a greenhouse effect of the earth. In addition, part of $CO_2$ discharged from the anode chamber 3 is recirculated to the upstream side and the remainder is branched out. The branched out $CO_2$ is used for purposes other than power generation: for example, for a methanol production as mixed with hydrogen gas.

Figure 5:
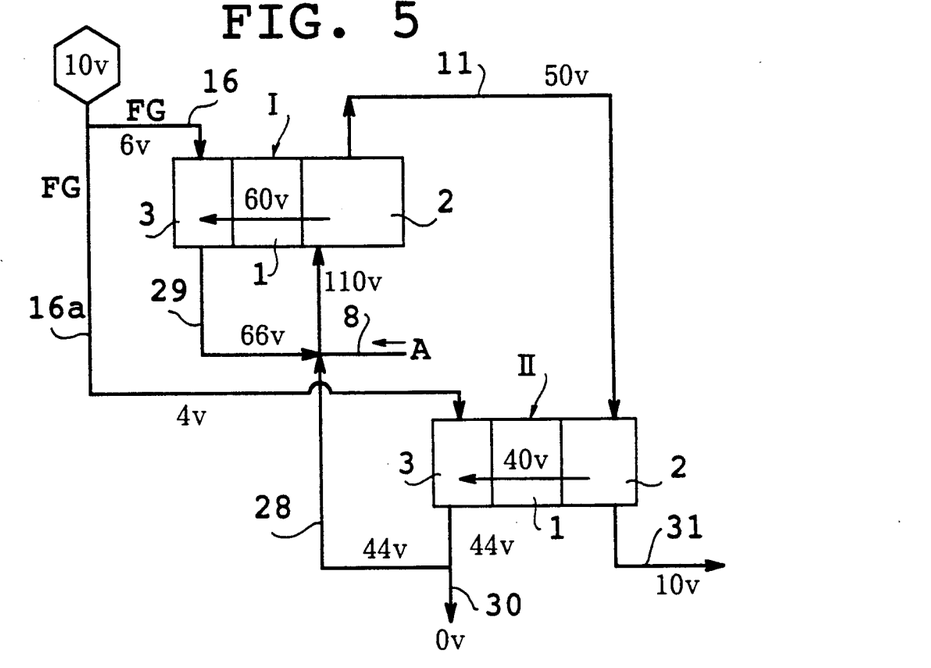
FIG. 5 shows a system diagram when an amount of $CO_2$ contained in fuel gas is relatively small as compared with the system of FIG. 4.

FIG. 5 is an example showing that in the same system as FIG. 4, the fuel gas which does not possess a sufficient amount of $CO_2$ is also satisfactory for the operation. Specifically, if the amount of $CO_2$ among the fuel gas is small, $CO_2$ discharged from the anode chamber 3 of the downstream fuel cell II is entirely recirculated to the cathode chamber 2 of the upstream fuel cell I to raise the $CO_2$ concentration at the cathode chamber entrance of the fuel cell I is raised to a required level. In addition, the $CO_2$ utilization factor is adjusted to be low and the amount of retaining $CO_2$ is increased. Therefore, an economical operation is possible and the power generation efficiency is improved. With taking advantages of this example, by-product gases produced in a chlorine plant which do not include $CO_2$ can be used.

Figure 6:
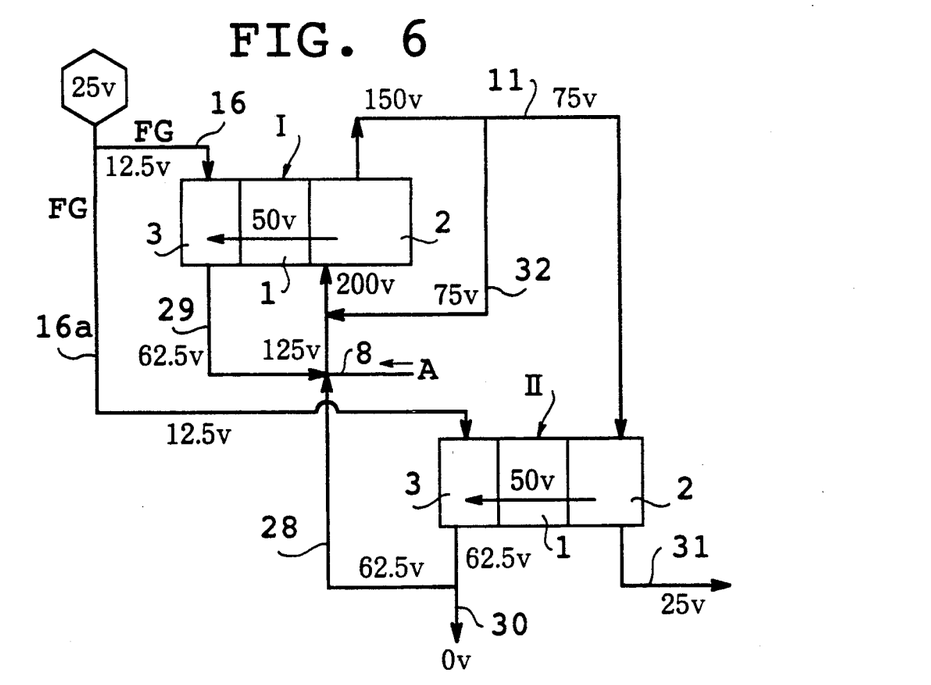
FIG. 6 is a schematic system diagram wherein a cathode recirculation technique is used in the embodiment of FIG. 3.
Figure 7:
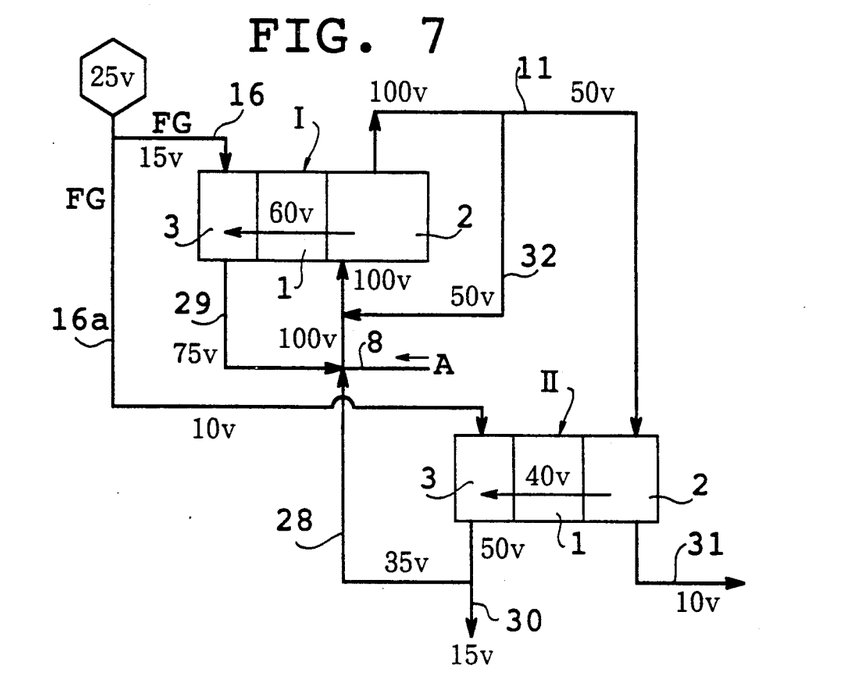
FIGS. 7, 8 and 9 respectively illustrate a system diagram wherein the cathode recirculation techinque is used in the embodiment of FIG. 4.

FIGS. 6 and 7 respectively illustrate other embodiments of the present invention. $CO_2$ discharged from the cathode chamber 2 of the upstream fuel cell I is recirculated by 50% such that the $CO_2$ gas composition at the cathode entrance and the $CO_2$ utilization factor are respectively changed.

In FIG. 6 which is similar to FIG. 3, 50% of $CO_2$ discharged from the cathode chamber 2 of the upstream fuel cell I is recirculated. In other words, half of $CO_2$ discharged from the cathode chamber 2 ($CO_2$ of 75 V) is recirculated to the cathode chamber entrance by a recirculation line 32 in a manner such that $CO_2$ transferred from the anode chamber 3 of the fuel cell I and $CO_2$ recirculated from the anode chamber 3 of the downstream fuel cell II, which sums 125 V, merge with the above-mentioned $CO_2$ of 75 V. Thus, the $CO_2$ utilization becomes 200 V. Among 200 V $CO_2$ transferred to the cathode chamber 2, 50 V is used for the reaction and the remaining $CO_2$ of 150 V is discharged from the cathode chamber exit. Among 150 V $CO_2$, 75 V is recirculated and another 75 V is fed to the cathode chamber 2 of the downstream fuel cell II. In this manner, the amount of $CO_2$ at the cathode chamber entrance is increased to 200 V while an amount used is constant, so that the utilization factor of $CO_2$ is 25%, which is lower than 40% of FIG. 3.

FIG. 7 shows a system similar to FIG. 4. As illustrated, 50% of $CO_2$ (50 V) discharged from the cathode chamber 2 of the upstream fuel cell I is recircualted to the cathode entrance by the recirculation line 32. Thereupon, a total amount of $CO_2$ at the cathode entrance becomes 160 V since $CO_2$ transferred from the anode chamber 3 of the fuel cell I and $CO_2$ recirculated from the anode chamber 3 of the downstream fuel cell II sum 110 V and the above-mentioned 50 V is added to 110 V. The amount of $CO_2$ fed to the cathode entrance is 160 V whereas the amount of $CO_2$ used is 60 V (constant), so that the $CO_2$ utilization factor is 37.5%. This value is smaller than 54.5% of FIG. 4.

Figure 8:
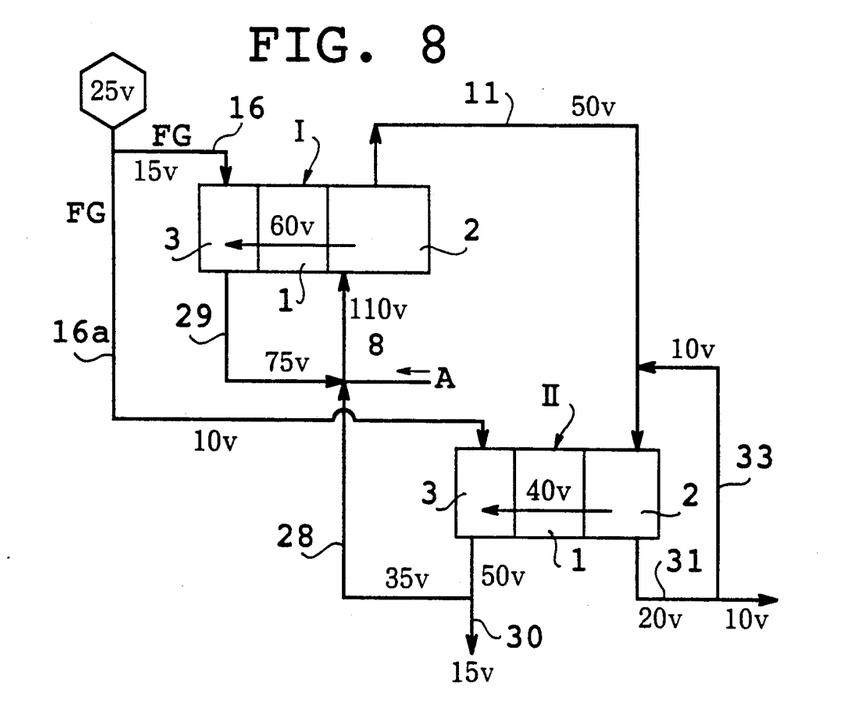

FIG. 8 illustrates still another embodiment of the present invention. FIG. 8 also shows a system similar to FIG. 4. 50% of $CO_2$ (10 V) discharged from the cathode chamber 2 of the downstream fuel cell II is recirculated to the cathode chamber entrance by a recirculation line 33. This 10 V $CO_2$ merges with 50 V $CO_2$ transmitted from the upstream fuel cell I at the cathode chamber entrance of the downstream fuel cell II. Therefore, the total becomes 60 V. The amount of $CO_2$ fed to the cathode chamber entrance is 60 V whereas the amount of $CO_2$ used is 40 V (constant), so that the $CO_2$ utilization factor is 66.7%. This value is smaller than 80% of a case of no recirculation.

Figure 9:
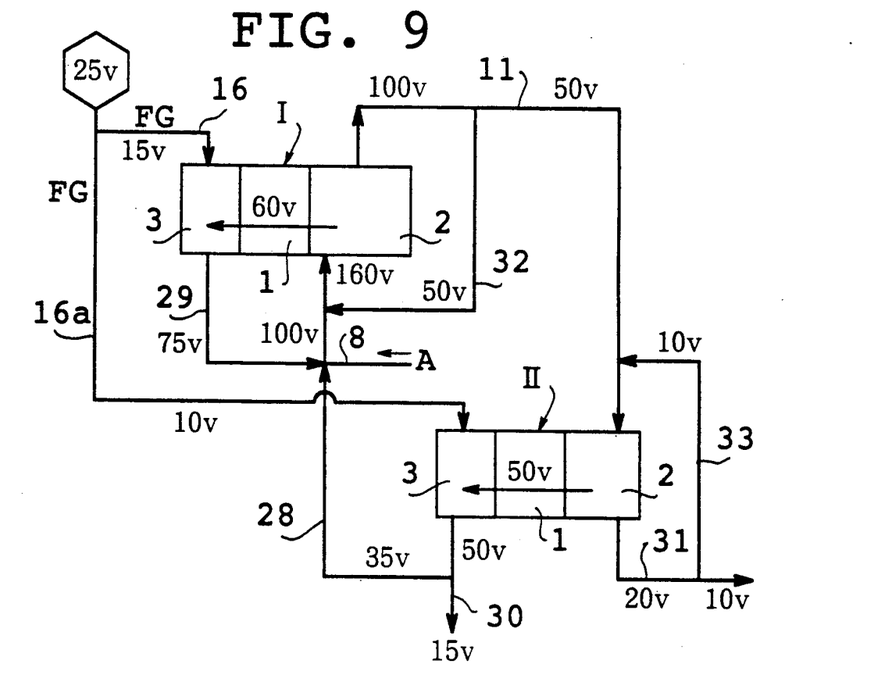

FIG. 9 depicts yet another embodiment of the present invention. This embodiment combines the cathode recirculation of the upstream fuel cell I of FIG. 7 with the cathode recirculation of the downstream fuel cell II of FIG. 8 (The cathode exhaust gas of the fuel cell II is recirculated to the cathode chamber entrance). Parts of $CO_2$ respectively discharged from the cathode chambers 2 of the fuel cells I and II are recirculated to their own cathode chamber entrances so as to lower the $CO_2$ utilization factor at the respective cathode chambers 2.

Figure 10:
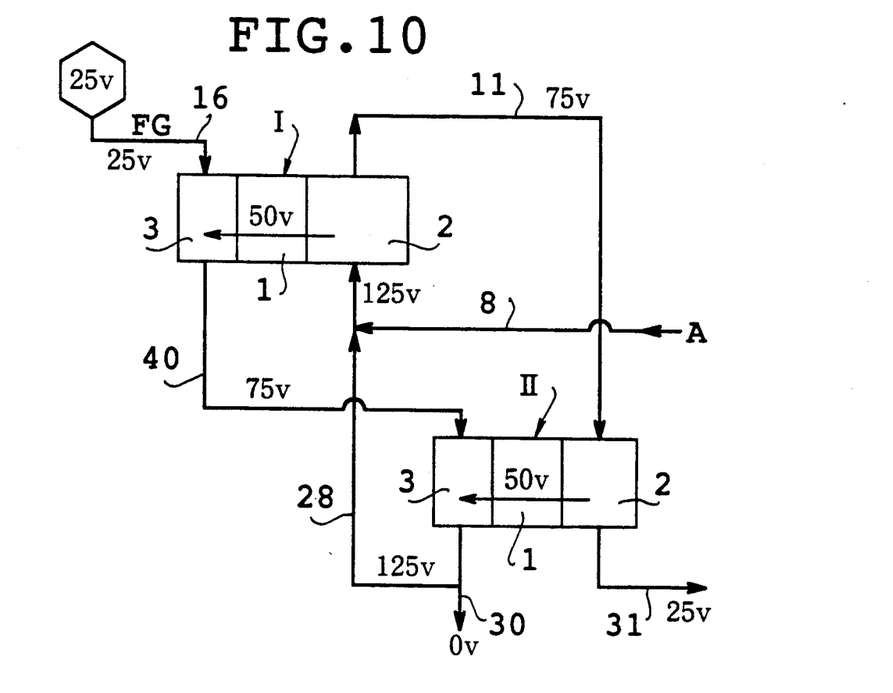
FIG. 10 schematically illustrates a system diagram of another embodiment of the present invention.

FIG. 10 also illustrates another embodiment of the present invention. In the embodiments of FIGS. 1 and 3 through 9, the fuel gas FG is directly fed to the upstream anode chamber 3 and the downstream anode chamber 3. On the other hand, in this particular embodiment (FIG. 10), the fuel gas FG is fed only to the anode chamber 3 of the upstream fuel cell I. The anode exhaust gas from the anode chamber 3 of the upstream fuel cell I, which contains unreacted combusible gases, are introduced to the anode chamber 3 of the downstream fuel cell II via the anode exhaust gas feed line 40. The anode exhaust gas from the downstream fuel cell II is then introduced to the cathode chamber entrance of the upstream fuel cell I through the $CO_2$ recirculation line 28 after it is merged with the air of the air feed line 8.

In this embodiment, the fuel gas is fed to the anode chamber 3 of the upstream fuel cell I only, but the anode exhaust gas from the downstream fuel cell II which contains $CO_2$ is fed to the cathode chamber 2 of the upstream fuel cell I. As a result, the same advantages as the embodiments of FIGS. 1 to 9 can be also obtained in this embodiment.

Figure 11:
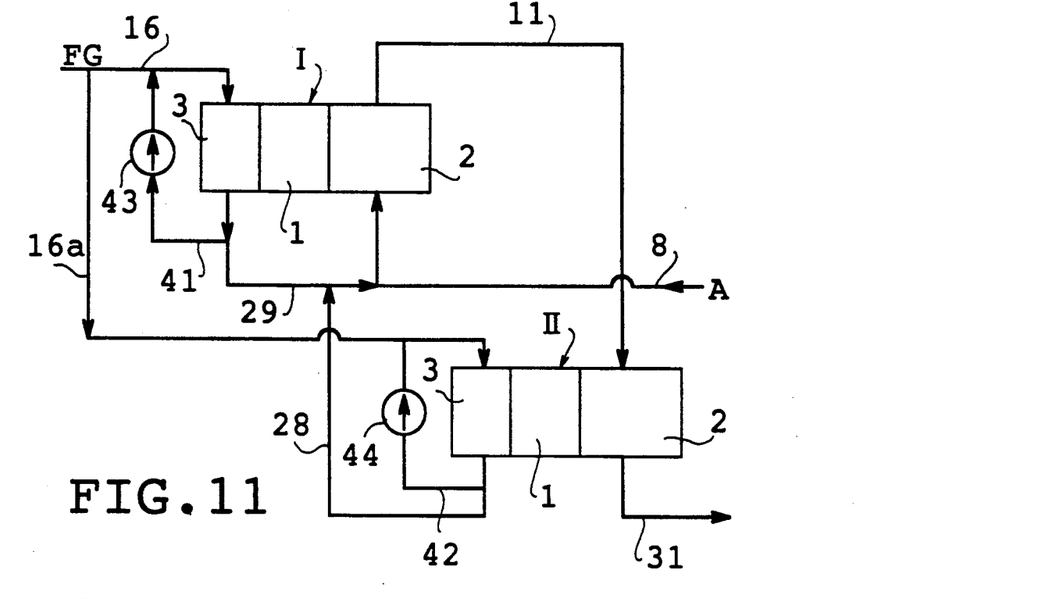
FIG. 11 also schematically illustrates a system diagram of another embodiment of the present invention.

FIG. 11 shows still another embodiment. This comes from a modification of the embodiments of FIGS. 3 to 5. There are provided anode exhaust gas recirculation lines 41 and 42. These lines are used to recirculate the anode exhaust gas to the anode chambers 3 of the upstream and downstream fuel cells I and II respectively. Blowers 43 and 44 are also provided on the respective lines 41 and 42.

Figure 12:
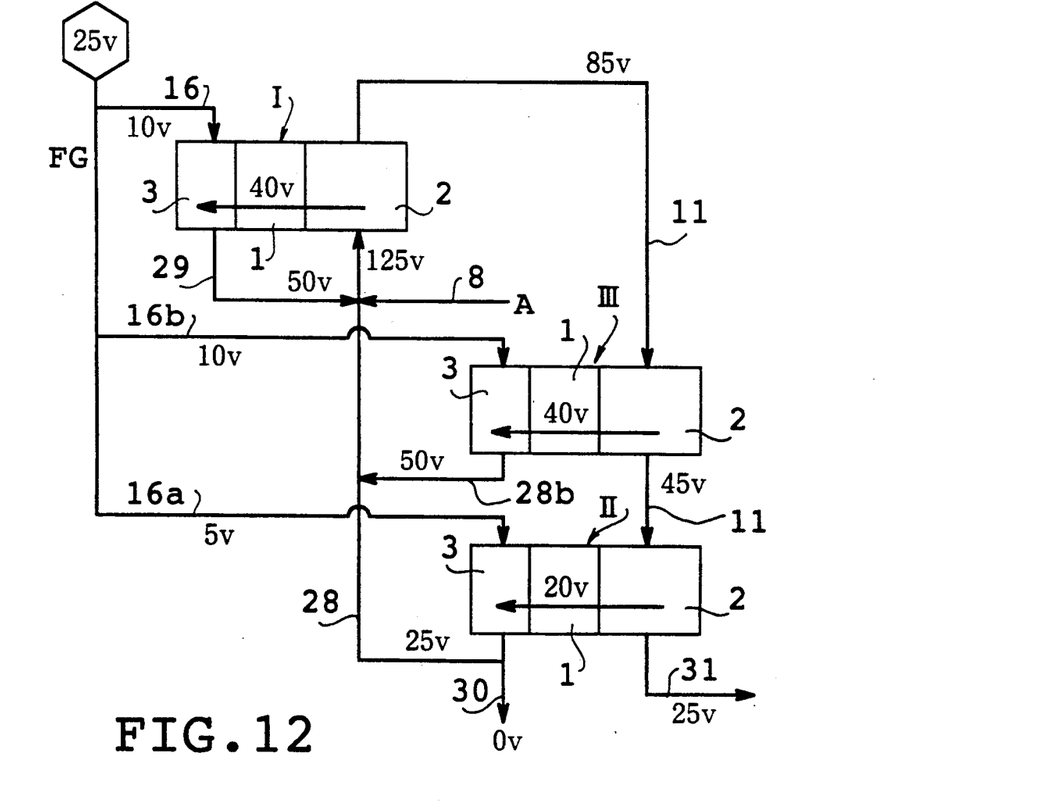
FIG. 12 schematically illustrates a system diagram of another embodiment of the present invention.
Figure 13:
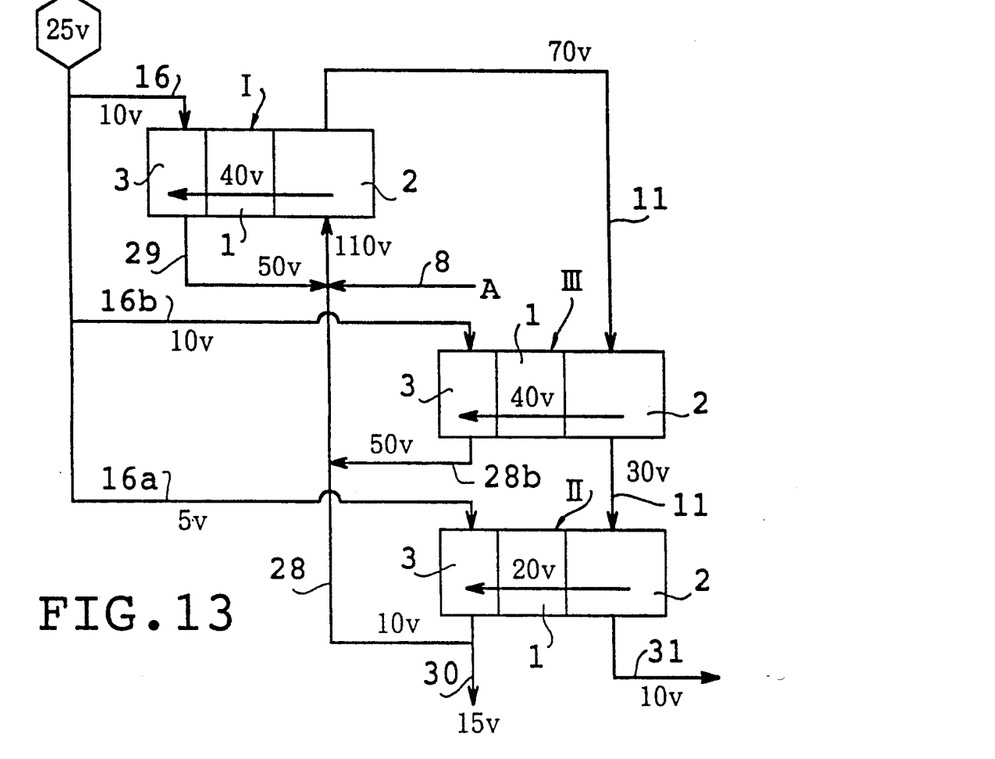
FIG. 13 also schematically illustrates a system diagram of another embodiment of the present invention.

FIGS. 12 and 13 respectively show other embodiments of the present invention. In the foregoing embodiments, there are provided two fuel cells, but in the following embodiments there are three fuel cells. The systems of FIGS. 12 and 13 are fundamentally same as the systems of the foregoing Figures. Specifically, the most upstream fuel cell I of FIG. 12, for example, corresponds to the fuel cell I of FIG. 3 and the most downstream fuel cell II of FIG. 12 corresponds to the fuel cell II of FIG. 3. The way of gas feeding and discharging of FIGS. 12 and 13 is same as that of other figures except the intermediate fuel cell III. The fuel gas FG is fed to the anode chambers 3 of the fuel cells I, II and III via the lines 16, 16b and 16a respectively. The cathode exhaust gas from the most upstream fuel cell I is in turn introducted to the cathode chambers 2 of the fuel cells II and III (the fuel cells downstream of the fuel cell I) via the line 11. $CO_2$ contained in the anode exhaust gas of the intermediate fuel cell III is introduced to the $CO_2$ recirculation line 28 extending from the anode chamber 3 of the most downstream fuel cell II, via the recirculation line 28b. Explanation other than above may be referred to the explanation of FIG. 3.

FIG. 13 illustrates a system similar to the system of FIG. 12. In FIG. 12, the volume of $CO_2$ which returns to the recirculation line 28 from the anode chamber 3 of the most downstream fuel cell via the $CO_2$ branch line 30 is zero V. In FIG. 13, on the other hand, the volume of $CO_2$ returning to the recirculation line 28 is set to 10 V, like FIG. 4. In FIG. 13, also, the volume of $CO_2$ discharged from the branch line 30 is set to 15 V.

Providing three fuel cells raises the $CO_2$ concentration as compared with the case of two fuel cells. FIG. 12 is a modified version of FIG. 3 and the following table shows the $CO_2$ utilization factors at the cathode of each fuel cell of FIGS. 3 and 12.

|  | FIGURE 3 | FIGURE 12 |
| --- | --- | --- |
| MOST UPSTREAM FUEL CELL (I) | 50/125 = 40% | 40/125 = 32% |
| INTERMEDIATE FUEL CELL (III) | — | 40/85 = 47% |
| MOST DOWNSTREAM FUEL CELL (II) | 50/75 = 66.7% | 20/45 = 44.4% |

FIG. 13 is a modified version of FIG. 4 and the following table shows the $CO_2$ utilization factors at the cathode of each fuel cell of FIGS. 4 and 13.

|  | FIGURE 4 | FIGURE 13 |
| --- | --- | --- |
| MOST UPSTREAM FUEL CELL (I) | 60/110 = 54.5% | 40/110 = 36.4% |
| INTERMEDIATE FUEL CELL (III) | — | 40/70 = 57% |
| MOST DOWNSTREAM FUEL CELL (II) | 40/50 = 80% | 20/30 = 66.7% |

Therefore, it is possible to lower the $CO_2$ utilization factor under the same requirements. Providing four fuel cells can lower the $CO_2$ utilization factor more.

The present invention is not limited to the above-described embodiments but may have other modes. For instance, in FIG. 3, $CO_2$ discharged from the cathode chamber 2 of the second fuel cell II may be further separated and recovered by another fuel cell and the recovered $CO_2$ may be recirculated to the cathode chamber entrance of the most upstream or first fuel cell I. In other words, there may be provided three or more fuel cells. Also, other modifications and changes may be made without departing from the spirit and the scope of the subjoined claims.

In summary, the present invention has following advantages:

Since $CO_2$ is separated and recovered from gases containing $CO_2$ discharged from the cathode of the molten carbonate fuel cell by the $CO_2$ separator and the recovered $CO_2$ is entirely or partially recirculated to the cathode chamber entrance while $CO_2$ discharged from the anode chamber is also transferred to the cathode chamber, with the amount of $CO_2$ used being maintained to be constant and therefore the surplus $CO_2$ being discharged from the cathode chamber so as to achieve the operation of low $CO_2$ utilization factor mode, the $CO_2$ concentration at the cathode chamber entrance becomes high and the surplus $CO_2$ is discharged to lower the $CO_2$ utilization factor. As a result, a large amount of $CO_2$ which promotes the feul cell reaction is retained in the cathode chamber and the $CO_2$ partial pressure from the cathode chamber entrance through the cathode chamber exit is maintained at a high level, thereby improving the power generation efficiency;

Furthermore, when the second fuel cell is provided as a $CO_2$ separator instead of the above-mentioned $CO_2$ separator and the cathode chambers of the two fuel cells are directly connected with each other, with the upstream or first fuel cell being operated in the low $CO_2$ utilization mode and with the downstream or second fuel cell performing the power generation using $CO_2$ from the cathode chamber of the first fuel cell, $CO_2$ is recovered from the anode chamber exit and recirculated to the first fuel cell, the first fuel cell generates voltage as high as the foreging case or the power generation efficiency can be improved. In addition, the second or downstream fuel cell performs the power generation while the $CO_2$ separation is proceeding, and the $CO_2$ utilization factor is raised. Thus, the amount of $CO_2$ recirculated to the upstream side can be increased and the amount of $CO_2$ to be expelled to atmosphere from the cathode chamber of the downstream fuel cell can be decreased. This contributes to the prevention of the greenhouse effect of the earth; and Moreover, the amount of $CO_2$, the $CO_2$ utilization factor and the $CO_2$ concentration at the cathode chamber(s) of the fuel cell(s) can be set to the most desirable values by recirculating part (50%, for example) of $CO_2$ discharged from the cathode chamber of the first fuel cell and/or the second fuel cell to its or their own cathode chamber entrance.

We claim:

1. A method of operating a power generation system using a fuel cell, the fuel cell including an electrolyte plate sandwiched by a cathode electrode and an anode electrode with a cathode chamber being provided on the cathode electrode and an anode chamber being provided on the anode electrode and with oxidizing gas being fed to the cathode chamber and fuel gas being fed to the anode chamber for power generation, using a $CO_2$ separator, comprising the steps of:
   (A) introducing gases (referred to as cathode exhaust gas) discharged from the cathode chamber, into the $CO_2$ separator;
   (B) introducing $CO_2$ contained in gases (referred to as anode exhaust gas) discharged from the anode chamber, to the cathode chamber; and
   (C) allowing at least part of the $CO_2$ separated by the $CO_2$ separator to merge with the $CO_2$ of the anode exhaust gas and recirculating them to the cathode chamber, whereby the power generation of high efficiency is achieved in the fuel cell at a low $CO_2$ utilization factor, using the $CO_2$ of high concentration fed to the cathode chamber.

2. The method of claim 1, wherein the fuel gas fed to the anode chamber contains $H_2$ and $CO_2$, and the $CO_2$ is about 25% with respect to $H_2$.

3. The method of claim 2, wherein the oxidizing gas fed to the cathode chamber contains air, the $CO_2$ contained in the anode exhaust gas and the $CO_2$ separated by the $CO_2$ separator.

4. The method of claim 3, wherein the cathode exhaust gas, from which the $CO_2$ has been separated by the $CO_2$ separator, is expelled to atmosphere.

5. A method of operating a power generation system using at least two fuel cells connected to each other in series, one fuel cell being located upstream of a next fuel cell, the fuel cell including an electrolyte plate sandwiched by a cathode electrode and an anode electrode with a cathode chamber being provided on the cathode electrode and an anode chamber being provided on the anode electrode and with oxidizing gas being fed to the cathode chamber and fuel gas being fed to the anode chamber for power generation, comprising the steps of:
   (A) introducing air to the cathode chamber of the most upstream fuel cell;
   (B) introducing the fuel gas to the anode chamber of each fuel cell;
   (C) recirculating at least part of the $CO_2$ of the anode exhaust gas discharged from the anode chamber of each fuel cell to the cathode chamber of the most upstream fuel cell; and
   (D) introducing the cathode exhaust gas discharged from each fuel cell, to the cathode chamber of the fuel cell downstream thereof, whereby the power generation of high efficiency is achieved in all the fuel cells at a low $CO_2$ utilization factor, using the $CO_2$ of high concentration fed to the cathode chambers of the fuel cells.

6. The method of claim 5, wherein the fuel gas fed to the anode chamber contains $H_2$ and the $CO_2$, and $CO_2$ is about 25% with respect to $H_2$.

7. The method of claim 5, wherein there are provided at least two fuel cells, a capacity of a fuel cell is about 1 to 1.5 times that of fuel cell downstream thereof, and the fuel gas is fed to the anode chambers of the fuel cells in accordance with the capacities of the fuel cells.

8. The method of claim 7, wherein the cathode exhaust gas discharged from the cathode chamber of the most downstream fuel cell is expelled to atmosphere.

9. A method of operating a power generation system using at least two fuel cells connected to each other in series, one fuel cell being located upstream of a next fuel cell, the fuel cell including an electrolyte plate sandwiched by a cathode electrode and an anode electrode with a cathode chamber being provided on the cathode electrode and an anode chamber being provided on the anode electrode and with oxidizing gas being fed to the cathode chamber and fuel gas being fed to the anode chamber for power generation, comprising the steps of:
   (A) introducing air to the cathode chamber of the most upstream fuel cell;
   (B) introducing the fuel gas to the anode chamber of each fuel cell;
   (C) recirculating at least part of the $CO_2$ of the anode exhaust gas discharged from the anode chamber of each fuel cell to the cathode chamber of the most upstream fuel cell; and
   (D) introducing part of the cathode exhaust gas discharged from each fuel cell, to the cathode chamber of a next fuel cell downstream thereof and introducing the remaining cathode exhaust gas to an entrance of the cathode chamber of the same fuel cell, whereby the power generation of high efficiency is achieved in all the fuel cells at a low $CO_2$ utilization factor, using the $CO_2$ of high concentration fed to the cathode chambers of the fuel cells.

10. The method of claim 9, wherein the fuel gas fed to the anode chamber contains $H_2$ and the $CO_2$, and the $CO_2$ is about 25% with respect to $H_2$.

11. The method of claim 10, wherein there are provided at least two fuel cells, a capacity of a fuel cell is about 1 to 1.5 times that of a fuel cell downstream thereof, and the fuel gas is fed to the anode chambers of the fuel cells in accordance with the capacities of the fuel cells.

12. The method of claim 11, wherein the cathode exhaust gas discharged from the cathode chamber of the most downstream fuel cell is expelled to atmosphere.

13. The method of claim 11, wherein the cathode exhaust gas discharged from the cathode chamber of the each fuel cell is divided approximately equally such that about one half of the cathode exhaust gas is fed to the cathode chamber of the same fuel cell whereas another about one half is fed to the fuel cell downstream thereof, with only another half from the most downstream fuel cell being expelled to atmosphere.

14. A method of operating a power generation system using at least two fuel cells connected to each other, one fuel cell being located upstream of a next fuel cell, the fuel cell including an electrolyte plate sandwiched by a cathode electrode and an anode electrode with a cathode chamber being provided on the cathode electrode and an anode chamber being provided on the anode electrode and with oxidizing gas being fed to the cathode chamber and fuel gas being fed to the anode chamber for power generation, comprising the steps of:
 (A) introducing air to the cathode chamber of the most upstream fuel cell;
 (B) introducing the fuel gas to the anode chamber of each fuel cell;
 (C) recirculating at least part of the $CO_2$ of the anode exhaust gas discharged from the anode chamber of each fuel cell to the cathode chamber of the most upstream fuel cell;
 (D) introducing the cathode exhaust gas discharged from each fuel cell, to the cathode chamber of a next fuel cell downstream thereof; and
 (E) introducing part of the cathode exhaust gas discharged from the most downstream fuel cell, to an entrance of the cathode chamber of the most downstream fuel cell, ved iny the power generation of high efficiency is achieved in all the fuel cells at a low $CO_2$ utilization factor, using the $CO_2$ of high concentration fed to the cathode chambers of the fuel cells.

15. The method of claim 14, wherein the fuel gas fed to the anode chamber contains $H_2$ and the $CO_2$, and $CO_2$ is about 25% with respect to $H_2$.

16. The method of claim 15, wherein there are provided at least two fuel cells, a capacity of one fuel cell is about 1 to 1.5 times that of another fuel cell downstream thereof, and the fuel gas is fed to the anode chambers of the fuel cells in accordance with the capacities of the fuel cells.

17. The method of claim 16, wherein the cathode exhaust gas discharged from the cathode chamber of the most downstream fuel cell is expelled to atmosphere.

18. The method of claim 17, wherein the cathode exhaust gas discharged from the cathode chamber of each fuel cell is partialy fed to an entrance of the cathode chamber of the same fuel cell.

19. A method of operating a power generation system using at least two fuel cells connected to each other, one fuel cell being located upstream of a next fuel cell, the fuel cell including an electrolyte plate sandwiched by a cathode electrode and an anode electrode with a cathode chamber being provided on the cathode electrode and an anode chamber being provided on the anode electrode and with oxidizing gas being fed to the cathode chamber and fuel gas being fed to the anode chamber for power generation, comprising the steps of:
 (A) introducing air to the cathode chamber of the most upstream fuel cell;
 (B) introducing the fuel gas to the anode chamber of the most upstream fuel cell and then introducing the anode exhaust gas of the most upstream fuel cell to the anode chambers of the fuel cells downstream thereof in turn; and
 (C) recirculating at least part of the $CO_2$ of the anode exhaust gas discharged from the anode chamber of the most downstream fuel cell to the cathode chamber of the most upstream fuel cell or whereby the power generation of high efficiency is achieved in all the fuel cells at a low the $CO_2$ utilization factor, using $CO_2$ of high concentration fed to the cathode chambers of the fuel cells.

20. A method of operating a power generation system using at least two fuel cells connected to each other, one fuel cell being located upstream of a next fuel cell, the fuel cell including an electrolyte plate sandwiched by a cathode electrode and an anode electrode with a cathode chamber being provided on the cathode electrode and an anode chamber being provided on the anode electrode and with oxidizing gas being fed to the cathode chamber and fuel gas being fed to the anode chamber for power generation, comprising the steps of:
 (A) introducing air to the cathode chamber of the most upstream fuel cell;
 (B) introducing the fuel gas to the anode chamber of each fuel cell;
 (C) recirculating at least part of the $CO_2$ of the anode exhaust gas discharged from the anode chamber of each fuel cell to the cathode chamber of the most upstream fuel cell; and
 (D) recirculating part of the anode exhaust gas discharged from the anode chamber of each fuel cell to the anode chamber of the same fuel cell, whereby the power generation of high efficiency is achieved in all the fuel cells at a low the $CO_2$ utilization factor, using $CO_2$ of high concentration fed to the cathode chambers of the fuel cells.

21. A method according to any of claims 1, 5, 9, 14, 19 or 20 and further including the step of taking part of the $CO_2$ out of the system for use use other than power generation.

22. A power generation system using a fuel cell, comprising: a fuel cell including an electrolyte plate sandwiched by a cathode electrode and an anode electrode with a cathode chamber being provided on the cathode electrode and an anode chamber being provided on the anode electrode; means for feeding an oxidizing gas to the cathode chamber and a fuel gas to the anode chamber for power generation; a $CO_2$ separator; means for introducing gases discharged from the cathode chamber into the $CO_2$ separator; means for introducing $CO_2$ contained in gases discharged from the anode chamber to the cathode chamber; and means for allowing at least part of the $CO_2$ separated by the $CO_2$ separator to merge with the $CO_2$ of the anode exhaust gas and recirculating them to the cathode chamber, whereby power generation of high efficiency is achieved in the fuel cell at a low $CO_2$ utilization factor, using the $CO_2$ of high concentration fed to the cathode chamber.

* * * * *

UNITED STATES PATENT AND TRADEMARK OFFICE
CERTIFICATE OF CORRECTION

PATENT NO. : 5,134,043

DATED : July 28, 1992

INVENTOR(S) : Kenzo Nakazawa

It is certified that error appears in the above-identified patent and that said Letters Patent is hereby corrected as shown below:

Column 13, Line 35 "downstream fuel cell, ved iny the power generation" should be -- downstream fuel cell, whereby the power generation --

Signed and Sealed this

Seventh Day of September, 1993

Attest:

BRUCE LEHMAN

Attesting Officer

Commissioner of Patents and Trademarks